Aug. 15, 1967  IKUYA NODA ET AL  3,335,596
METHODS AND APPARATUS FOR MANUFACTURE OF H-SECTION
STEEL HAVING SURFACE PROJECTIONS
Filed Sept. 25, 1964

United States Patent Office 3,335,596
Patented Aug. 15, 1967

3,335,596
METHODS AND APPARATUS FOR MANUFACTURE OF H-SECTION STEEL HAVING SURFACE PROJECTIONS
Ikuya Noda, Kimihiro Kato, Akira Yamamoto, Katsutoshi Okano, Takashi Ueta, Hisao Minami, and Ryo Hirano, all of Himeji-shi, Japan, assignors to Fuji Iron & Steel Co., Ltd., Tokyo, Japan
Filed Sept. 25, 1964, Ser. No. 399,300
Claims priority, application Japan, Oct. 1, 1963, 38/53,071; Nov. 5, 1963, 38/59,843, 38/83,668; Feb. 19, 1964, 39/8,954
8 Claims. (Cl. 72—366)

This invention relates to methods and apparatus for manufacturing a steel H-section having suitable projections on its surfaces, namely on the outer surface of the flanges and/or the surface of the web, by means of steel H-section rolling mill having suitable notches on the flange rolling surface of a pair of vertical rolls and/or on the web rolling surface of upper and lower horizontal rolls thereof, and further relates to methods of forming projections of the same height and configuration over the entire outer surface of flanges in the process of manufacturing a steel H-section having suitable projections on the outer surface of flanges thereof alone or both on the surface of the flanges and the surface of the web.

A steel H-section has good sectional efficiency, and can save cost and construction time when used in many fields of applications, and it is widely known that it is used particularly as a structural material, because of its simpleness for sectional combination and adjoining. Also it is generally used as piling and temporary constructing material, because of its large supporting strength, easiness for transportation and construction, and usability as a basepile, as well as its ability of firm adjoining to upper constructions and superiority in horizontal strength and ability to be repeatedly used as a temporary assembly. Furthermore, it has been found that by forming various kinds of projections on the surface of such ordinary steel H-sections or on the outer surfaces of the flanges and/or on the surface of the web, more advantageous characteristics may be obtained in its use as a structural material, a piling, or a temporary constructing material.

One of the objects of the present invention is therefore to provide novel methods of manufacturing economically and easily a steel H-section having projections on the surface so as to be excellent in using it as a structural material, a piling material, a temporarily used constructing material, a road covering material and etc.

Another object of the present invention is to provide a novel method of forming projections of the same height and configuration over the entire outer surface of flanges in the manufacturing of H-section steel having suitable projections on the outer surface of flanges thereof or on the outer surface of flanges and on the web surface.

The other object of the present invention is to provide an apparatus to manufacture such a steel H-section economically and easily.

Above mentioned objects and others of the invention will be made more clear from the following description of illustrative embodiments.

Referring to the type and number of projections which are formed on the flange surface and/or on the surface of the web of steel H-sections according to the present invention, they shall not be limited to those shown in each of FIG. 2 to FIG. 7 and may be formed on any desired surface and further various kinds of projections in combination may be formed on the same surface or on several desired surfaces.

Steel H-sections having various projections on the flange surface and/or on the surface of the web manufactured according to the present invention, as mentioned above, is accompanied by the superior properties in addition to those of regular steel H-sections as a structural, piling, or temporarily used constructing material.

Namely, when it is used as structural materials, the projections look very fine, having good adherence to concrete material, and when it is used as piling it has high adherence to sand and mud. For example, when a steel H-section having striped projections is used as a pile it may be easily driven down vertically. As a temporarily used constructing material, for example as a trench cover deck for covering a dug road in a subway construction, a steel H-section having projections on the outer surface of flanges is very useful, as will be mentioned later.

Up to the present time, the trench cover deck has been constructed by arranging many steel floor plates on a large number of auxiliary girders supported by main girders. And this steel floor plate has been a specially sized steel plate of 1 m. width, 2 m. length and 20 cm. thickness having a raised pattern on its surface, designed for car passage thereon. These conventional steel floor plates are so small, that they cannot be used again after being used as a road-covering, and require very expensive processing. Further, said trench cover deck is so high, because it is constructed by three floors, namely large beams, small beams and steel floor plate, and requires deeper holes; hence higher cost of construction. The unit area of such floor plates is so small that it requires more labor to mantle and dismantle them, and a firm construction is hard to obtain because of so many joining points, and the floor and the joining points are often severely damaged, which causes dangers to the pedestrians and passing cars thereon, as well as workmen thereunder. But when steel sections, having projections on the outer surface of flanges manufactured according to the present invention, are used in the trench cover deck, instead of using small beams and steel floor plates, by arranging steel H-sections having projections on the outer surface of the flange parallel on the large beams, using said outer surface as road surface, the required number of large beams is decreased very much as compared with the case in which a conventional floor plate of single span having about 2 m. length is used, because the effective span length can be greatly increased. Remarkable constructional advantages can be secured because a continuous beam of several spans (commonly three spans) is used, and the conventional floor plate of one span is provided as a single beam. Looseness of the construction during use is greatly decreased, because the required number of joints for covering a given length is reduced, and thus the labor of mantling an dismantling a steel assembly is greatly decreased. Further, when the H-section having projections on the outer surface of flange according to the present invention is used in the trench cover deck as above, its length can be optionally selected. For example when a steel H-section of 10 m. length is used, it may be used repeatedly for other purposes economically, for example, as constructing material other than the trench cover, structural material, or piling material, and simultaneously it has good adherence to concrete materials and sand and mud, and contributes substantially to a decrease in the construction cost.

Further, the steel H-section having projections on the outer surface of the flange according to the present invention may be used effectively as a steel bed plate for bridges and structures.

Generally, the methods of manufacturing a steel H-section in a hot rolling mill may be classified as follows.

(A) Method by means of a universal roll mill.

(B) Method of forming a steel H-section only through the grooves of rolls of a double or triple roll type shaping roll mill.

(C) Combined method (A) and (B).

(D) Method of forming principally through the grooves of rolls of a double or triple roll type shaping roll mill and reinforcing the rolling of the flanges of H-section steel by sub-vertical rolls, which are secured between the grooves with suitable means.

In the manufacturing for steel H-section having projections on the outer surface of flanges and/or on the surface of web according to the present invention, the methods of (A), (C) and (D) are used to form projections on the outer surface of the flange and/or web or the method (B) is used to form projections on the web surface. In any of these methods, a roughing roll mill with rolls having notches on their surface, or a finishing roll mill with rolls having notches on their surfaces, is employed after rough rolling in the rolling line. Generally, it is desirable to combine both the roughing roll mill with ordinary flat rolls and the finishing roll mill with notched rolls.

Further, the projection-forming roll mill with notched rolls may be used after ordinary finish rolling. Also a finishing roll mill and/or a flange edging roll mill may be used to finish the projections on the surface of the steel H-section or the form of the steel H-sections themselves.

The methods of the present invention, which are related to rolling methods (A), (C) and (D), above, are used for forming projections on the surfaces of steel H-sections, such as on the outer surface of one or both flanges and/or on one or both web surfaces. These projections are formed by using a roughing roll mill or a finishing roll mill with a pair of vertical rolls, or a pair of upper and lower horizontal rolls, having suitable notches or recesses in the rolling surfaces of the rolls. During the rolling, these form selected projections on the outer surface of one or both flanges or on both surfaces of the web by combining these rolls. Alternatively, the rolls may be used to form projections on the outer surface of only one flange or to form suitable projections on the outer surface of both flanges or on one or both surfaces of the web. This is effected by using various combinations of plain and configured rolls.

For example, in the case of using a finishing roll mill having rolls with notched surfaces, the roll mill can finish the H-section steel to accurate dimensions by one-pass, and simultaneously can form suitable projection on the outer surfaces of the flanges and/or on the surface of the web, corresponding to the used rolls. Some kinds of projections may be formed by more than one rolling-pass. The configuration of projection, which is formed on the outer surface of flange and/or on the surface of the web, has no limitation as mentioned, but generally the height of projection is desirably less than 5 mm. and, when it is beyond 5 mm. limit, it is difficult to obtain the desired configuration. As for the sectional shape of the projections, the desired configuration can be obtained more easily when the projections have a smaller inclination toward the flange surface, and the more round the projection-tip is, the more easily the desired configuration may be made; for example, a projection with half-round sectional area is more easy to roll than that with rectangular sectional area. The above points should be considered in rolling operations.

As for various conditions such as the number of roll passes, the rolling temperature, the rolling speed, the rolling reduction, etc. they vary depending upon the grade, sectional area, wall thickness, configuration of projection, etc. of the material to be rolled. Generally, when notched rolls are used in the roughing roll mill for a killed steel, it is desirable to start the rolling at temperature of 1130–980° C. and finish at 960–730° C. In the case of semi-killed steel and rimmed steel, it is desirable to start rough rolling at 1160–980° C. and finish at 1000–850° C. In such cases, independently of the kind of steel, the rolling speed of the last pass in rough rolling for forming projections on the surface is within a range of 0.5–3.0 m./sec., and the reduction rate depends upon the wall thickness, height and configuration of the desired projection, and desirably within the range of 0.5–15 mm. generally.

For obtaining projections of uniform height on the surface of H-section steel, larger reduction is required for thicker materials and, in the case of using rolls having roll-notches of same depth, projections of smaller height, which will not fill up the notches, are obtained by applying a smaller reduction, and thus it is possible to control the height or sectional figure of projections by controlling the reduction.

When a roughing roll mill is provided with flat rolls and a finishing roll mill is provided with notched rolls, in case of a killed steel, it is desirable to start rough rolling at 1130–980° C., and to start finish rolling at 960–870° C. and finish at 940–730° C. Also, in the case of a semi-killed steel or rimmed steel, it is desirable to finish roughing rolling at 1160–990° C., to start finish rolling at 1050–870° C. and finish at 1000–850° C.

Conditions such as the rolling speed and reduction rate for the last pass of the finshing roll mill to form projections on the surface of a steel H-section is just the same as in the case of the roughing roll mill with notched rolls as above described.

Under the above rolling conditions, in case of either a roughing roll mill or a finishing roll mill, multiple-pass reciprocating rolling can be performed. Generally, it is often more effective to perform multiple rolling passes by a roughing roll mill having flat rolls, and then perform one rolling pass by a finishing roll mill having notched rolls.

The above described conditions may be applied to any of the following cases of forming projections; forming them on the outer surface of the web, forming them on the surface of a flange, or forming them in combinations of these cases.

One example of the present invention using a finishing rolling mill having notched rolls or universal rolling system is described with reference to FIGS. 1 and 2.

Figure 1:
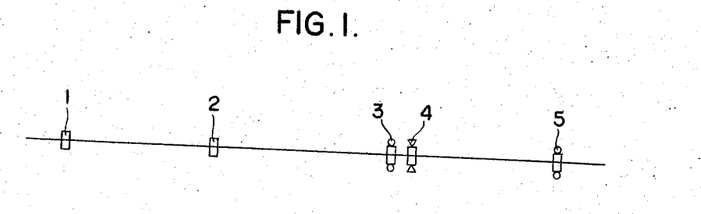
FIG. 1 is an illustrative view of a flowsheet for the manufacture of the H-section steel by means of a universal roll mill.
Figure 2A:
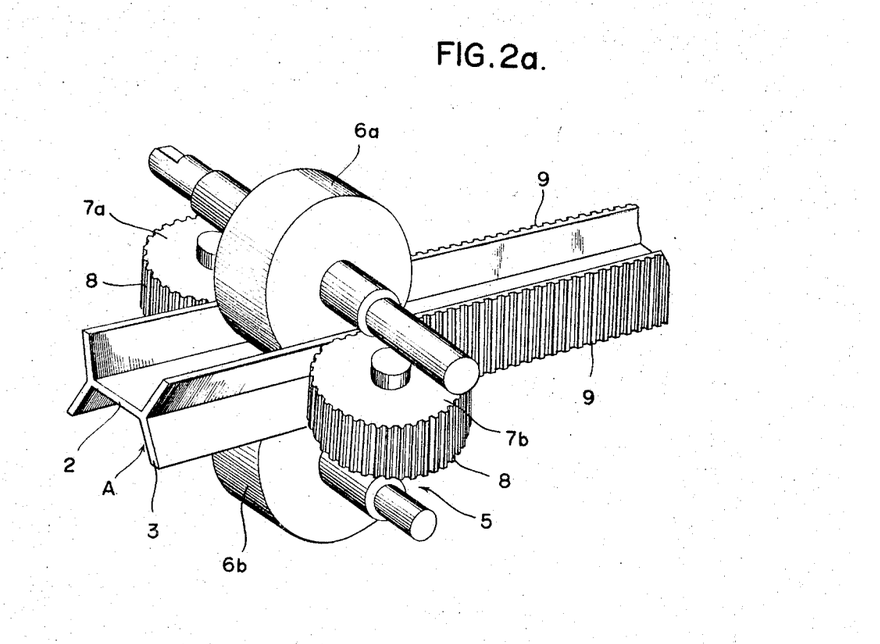
FIG. 2(a) and (b) are illustrative views of embodiments of the present invention using a universal finishing roll mill.
Figure 2B:
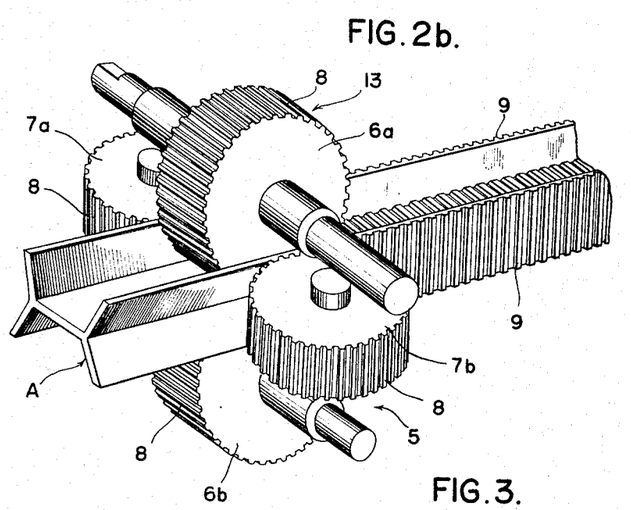

FIG. 1 shows a rolling line for a steel H-section, wherein an ingot is rolled through a blooming mill 1, into required dimensions, subjected, if necessary, to a suitable heat treatment, and entered into No. 1 roughing roll mill (rough break down mill 2), and then passed through No. 2 roughing roll mill (rough universal mill 3). Then the material is rolled in all directions. The top portion of hte flange is rolled by a flange top rolling mill (edging mill 4), then by using a finishing roll mill having notched rolls on the rolling surfaces (finishing universal mill 5), the flange is rolled into a steel vertical position, and the material is formed into H-section with accurate form and dimensions. Simultaneously required surface, projections are formed into a finished shape. FIGS. 2a and 2b are detailed views of an important part 5 of FIG. 1, and particularly show a case of forming projections on the outer surface of both flanges (FIG. 1a) and a case of forming them on the outer surface of both flanges and on both web surfaces (FIG. 1b) using a finishing roll mill (finishing universal mill 5). Said fining roll mill 5 consists of one pair of upper and lower horizontal rolls 6 and one pair of vertical rolls 7 and, in the case of FIG. 2(a) said one pair of vertical rolls 7 have required notches 8 on the rolling surface, whereby the outer surface of both flanges of steel H-section (A) is rolled and suitable projections 9 are formed on the outer surface of both flanges. FIG. 2(b) further shows a case of forming projections on the outer surface of both flanges of steel H-section (A) and on the both web surfaces, by means of similarly desired notches on the surface of upper and lower horizontal rolls.

Further, this invention relates to methods for forming projections of uniform height over the entire surface. Their features reside in that, in the manufacturing of steel H-sections having projections on the outer surface of flanges and/or on the web surface, when a material to be rolled has been brought in a rolling line, the rolling resistance of the flange portion is equalized by adjusting the temperature, or the amount of reduction in the web portion, or by adjusting both of them, and then rolling is effected using a steel H-section rolling mill provided with notched vertical rolls, or with both notched vertical rolls and notched horizontal rolls, and the metal of the flange portion enters into the notches of the rolling surface of the vertical rolls uniformly and fully.

Figure 8:
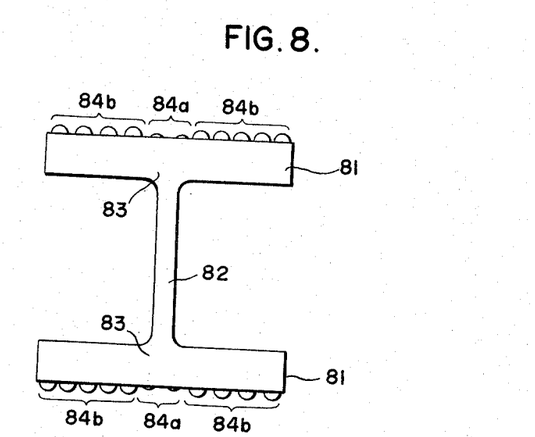
FIG. 8 is an illustrative view of a steel H-section having projections of irregular height.

Heights and configurations of projections manufactured according to the above mentioned method are uniform, but in forming projections on the outer surface of the flange or on the outer surface of the flange and on the surface of the web, projections 84 on the outer surface of the flange 81 of H-section steel as shown in FIG. 8 have such tendency that the projections 84a on the outer surface of the flange portion corresponding to the joining part 83 of the web 82 and the flange 81 have a lower height than the other projections 84b.

Figure 9:
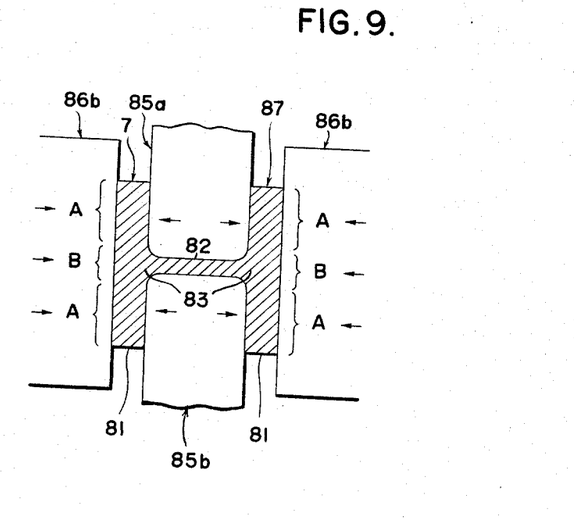
FIG. 9 is an illustrative view showing the manner in which projections of irregular height are formed on the outer surface of flanges in rolling by means of a universal rolling mill.

We have studied the causes of such irregularity in heights and configurations of the projections on the surface of a steel H-section as described above, and it has been found that, in the forming of projections on the outer surface of flange by projection-forming finishing-universal roll mill as shown in FIG. 9 for example, the part B of the flange 81 of the material is at a higher temperature than the part A as shown in FIG. 9, and therefore the temperature distrubution at the flange portion is not uniform and thus the rolling resistance of the flange portion against the vertical rolls 86a, 86b is not uniform. Moreover, the joining part 83 of the flange and the web is supported only by the hot-and-soft web 82, and this results in a small supporting force for rolling between the vertical rolls 86a, 86b.

When a steel H-section is rolled, as mentioned above, the part of the flange which is located at the joining part of the web and the flange is at a higher temperature than the other parts of the flange. Thus the joining part of the flange has a smaller material deforming-resistance than the other parts of the flange, and therefore when it is rolled by the vertical roll stand having notched rolls, its elongation in the rolling direction becomes larger. As the joining part is supported only by the hot-and-soft web, the flange, in the joining part, has a smaller supporting force for the vertical rolls than the other parts of the flange, and consequently at the flange of the joining part, the amount of metal to enter into the notches on the rolling surface of the vertical rolls is smaller than at the other parts of flange.

Accordingly, in the practice of the present invention, based on the fact that decrease in the temperature of the material will increase the deformation resistance and simultaneously decrease the elongation in rolling direction of the material, the temperature of the joining part is decreased by cooling the joining part or the flange of the joining part so that the temperature difference is decreased as much as possible, whereby the deformation resistance in all parts of the flange is made uniform, as well as the elongation of the flange in the rolling direction during the rolling by vertical rolls is made uniform. Further, the hot-and-soft web, which has small supporting force at the joining part, is cooled to decrease the temperature of the web near the joining part at least, and by increasing the deformation resistance of the web, the supporting force of the joining part is increased and the rolling resistance of the flange is equalized. Then the rolling is done to form projections on the outer surface of flanges, or on outer surface of flanges and on the surface of the web, as described in detail later. In this case, the temperature of the material to be rolled varies depending upon the grade, sectional size, thickness, etc., of the material, but generally it is not so desirable to decrease the temperature to about or less than 550° C. for rolling the steel H-section itself and, on the other hand it is also not desirable to increase the temperature to more than about 850° C., because the supporting force of the web to support the joining part becomes too small. Accordingly it is desirable to maintain the temperature in the web of the material to be rolled at about 650° C.–850° C. and to control the temperature of the flange at more than 650° C.

The cooling method for the joining part at the web and the flange and the web may be performed by natural cooling of the material to be rolled, or may be performed by using desirable coolants, for example, by jetting water, air or its mixture, etc. on the joining part and the web. Cooling of the web may be done by a cooled roll.

In this case it is possible, to adjust the height and the sectional contour of the projections to be formed, both on the outer surface, of the flange and the web surface by controlling the temperature of the material.

Reduction for forming the flange or the web varies depending upon the thickness of material to be rolled, and the height and the shape of desired projections to be formed, but, in general, it may optionally be the same or more than the reduction of the finish-rolling of ordinary steel H-sections. In this case, the thicker the material to be rolled the larger the reduction necessary for obtaining the equal height of the projections and, when using rolls having the uniform depth of grooves or notches, as a small amount of reduction forms low projections which do not fill up the notch, it is possible to adjust the height and shape of the projections by adjusting the amount of reduction.

As for the rolling speed, it is sufficient to take the ordinary speed applied in the finishing rolling for steel H-sections and, if necessary, it is possible to use more or less speed optionally.

Further, the present invention relates to the rolling for forming projections of uniform height all over the outer surface of the flange when forming projections on the outer surface of flange or on the outer surface of the flange and the web surface, which will be described below, by adjusting the reduction in the web which has small supporting force for the joining part of the web and the flange.

That is to say, the joining part of the web and the flange of the material to be rolled is supported only by the hot-and-soft web, as mentioned before, and therefore the joining part of the flange has a smaller supporting force for rolling of the vertical roll than the other flange which is supported by the side of the horizontal roll. In general, in H-shaped steel, the rolling pressure at the joining part of the web and the flange is the total sum of the pressures, applied by the horizontal and the vertical rolls.

Accordingly, in the present invention, the whole pressure at the joining part is increased artificially by increasing the amount of reduction applied by horizontal rolls so that the decreased supporting force for vertical rolls due to the hot-and-soft web pressed by horizontal rolls, is reinforced, thus obtaining uniform rolling resistance on the whole area of the flanges, and projections are formed on the outer surface of the flange or on the outer surface of the flange and on the surface of web. In this way, rolling for forming projections of uniform height over the entire outer surface of the flange is performed.

In this case, the amount of reduction in the web somewhat varies depending upon the sectional dimensions and wall thickness of the material to be rolled, but generally it is desirable to make the reduction about 1.2–10.0 times as large as the reduction in webs during finish rolling of ordinary steel H-sections; if it is under 1.2 times, the supporting force for the joining part of web and flange is not sufficient, and if it is over 10.0 times, the rolling of the steel H-section itself is not good and the consumption of notches on the rolling surface of the horizontal roll for forming projections on the web surface is increased. If reduction in the flange is not balanced with the increased reduction in the web, wavings on the web will be caused. In order to eliminate the threat of the wavings, a certain amount of reduction is taken so as to balance the elongation of web with the elongation of flange.

As for the rolling speed, it can be taken as much as the rolling speed of finish rolling for ordinary H-section steel, or otherwise optionally, but care must be taken that, when the reduction is increased, loading current is increased correspondingly and simultaneously the load current is increased through forming projections. Therefore, it is necessary to limit the speed within the motor capacity and on the other hand the consumption of notches on the rolling surface of the roll is increased.

In this case, as mentioned before, for obtaining uniform height of projections, the thicker the material to be rolled the larger the amount of reduction required and, when a roll having notches of uniform height is used, lower projections which do not fill up the depth of the notches can be obtained by smaller reduction. Therefore it is possible to adjust the height and sectional contour of the projections by adjusting the amount of reduction.

It is also possible to use the above mentioned web-reduction-adjusting method and the above mentioned temperature adjusting method in combination and in this case, it is possible to form higher projections than those to be obtained by each of the above mentioned methods.

Further the present inventors studied the results of the above described methods, and when a steel H-section having projections on the outer surface of flange is manufactured by the method of universal rolling, it became clear that the height of projections on the outer surface of flange of the H-section steel will sometimes be irregular, as shown in FIG. 8.

The explanation of this fact is as follows. In FIG. 1, a material to be rolled by a projection-forming finishing universal roll mill 5, is rolled into rough shapes near to the finished product as shown in FIG. 10 with hatched line, by the group of roughing universal roll mills 3, 4.

Figure 10:
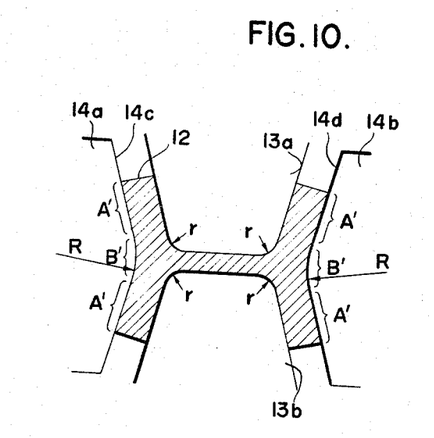
FIG. 10 is an illustrative view of the rolled state of a material formed by rough universal roll mill according to the process shown in FIG. 1.

In FIG. 10, 13a, and 13b show upper and lower horizontal rolls of a roughing universal roll mill, 14a, and 14b, right and left vertical rolls and 14c and 14d, peripheral surfaces of the vertical rolls 14a, 14b.

In the group consisting of such roughing universal roll mill 3 and the flange-edge rolling mill 4, the material A is rolled to required web-thickness, flange-thickness and flange-height by several or more reversing passes and is sent to the projection-forming finishing universal roll mill of FIG. 1, or FIG. 9, FIG. 2, and herein is finished and simultaneously projections are formed on the outer surface of the flange. In this case, as mentioned before, because of nonuniformity of the rolling resistance at the (A) and (B) parts of the flange caused by temperature difference explained in reference to FIG. 9, because of the shortage of supporting force due to the supporting only by the hot and soft web, and because the part (B') of the material, as shown in FIG. 10, which is rolled by the roughing universal roll mill of FIG. 1 or FIG. 10 and supplied, is thicker than the thickness of the part (A') by the effect of contours of the rolls, for example radius r at the corner of the horizontal rolls 13a, 13b, radius (R) at the central projected part of the vertical rolls 14a, 14b, etc., even when the reduction in the part (A) is equal to that in the part (B), the reduction in (B) part is necessarily smaller than that in (A) part in FIG. 9. For this reason, the pressure by the vertical rolls 6a, 6b is not so sufficient on part (B) as on part (A), so that at the part (B) the material does not fill up completely notches which are provided on the surface of the vertical rolls 6a, 6b.

There is also a further reason. In a common rolling mill train, for the purpose of decreasing the number of rolls which must be available at hand and the number of changing rolls, the same configuration of the rolling surface 14c, 14d in the vertical rolls 14a, 14b in roughing universal roll mills, shown in FIG. 10, is often used in rolling the material of several different kinds and sizes. In such case, the reduction in the part (A) and the part (B) through a projection-forming finishing universal roll mill, as shown in FIG. 9, is suitable for one kind of material or one size of material. For example, if it is desired to roll a thicker web, the part (B) will have less amount of metal filling the notches on the surface of the vertical roll than the part (A). The reasons for this is that, for example, when the vertical roll in the roughing universal roll mill is designed to give the flange an inclination of about 6° outwardly from the vertical line, if it is desired to manufacture the product which has the same flange thickness with a thicker web by $t$ m./m., the reduction in the center of (B) part or (B) part in the center line of the web is decreased by about $0.05 \times t$ mm.

Thus, as one method to prevent the projection of the the part (B) being lower than that of the part A, due to the smaller reduction in the part (B) than that in the part (A), it is possible to increase the height of the projections on the part (B) up to that of the projections on the part (A) by increasing as much as possible the reduction by vertical rolls having notches thereon during the projection-forming rolling. But in this case, the damages and consumptions of the notches on the rolling surface of the vertical rolls 6a, 6b are increased, and thus the expense of rolls is correspondingly increased, and configurations of the projections formed on the outer surface of the flange become irregular; hence the product cannot serve in a practical application.

Therefore, the object of the present invention is to prevent irregularity in the height and configuration of the projections which are formed on the outer surface of the flanges of a steel H-section produced according to the above mentioned universal rolling system, and to provide methods of forming projections of uniform form and configuration over the entire outer surface of flanges of the steel H-section. The features reside in that, through suitable variation of the patterns on the rolling surfaces of vertical rolls in a roughing universal roll mill, the thickness of the outer surface of the joining part of the web and the flange of the material to be supplied to the projection-forming finishing universal roll mill is increased and, by increasing the reduction in the outer surface of the joining part of the web and the flange in the projection-forming finishing roll mill, projections of uniform height and configuration are formed over the entire outer surface of the flange.

In this case, as for the increase in thickness of the outside surface of the joining part of the web and the flange of the material, it is sufficient to make the reduction almost uniform over the entire flange but as mentioned before, the outside surface of the joining part of the web and the flange is supported by the hot-and-soft web only and this joining part is the part of highest temperature in a steel H-section during rolling. As the metal in this part is easy to move to other parts, it is effective to increase the thickness somewhat more than above described, so as to supplement the moved metal and in consideration of multi-use of the vertical rolls.

In the present invention, the selection for the form of vertical rolls for the purpose of increasing the thickness of the joining part of the web and the flange of the material to be rolled may be made according to the dimensions of the steel H-sction, having projections on the outer surface of the flanges, to be manufactured; the web thickness, the flange thickness, the web height and the flange width etc.

Figure 11:
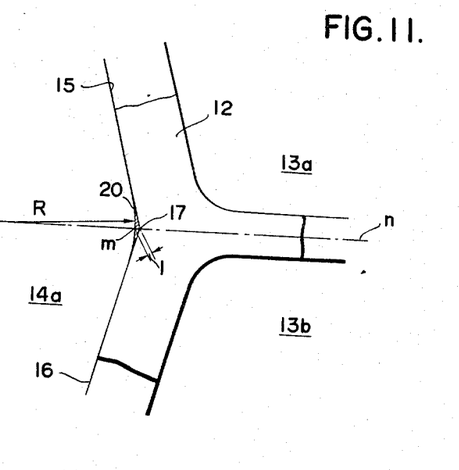
FIG. 11 is an illustrative view of flat vertical rolls shown in FIG. 10, mounted on a rough universal roll mill shown.

Examples of the forms of the vertical rolls will be explained in reference with FIG. 11 to FIG. 15 as follows. FIG. 11 shows the form of the vertical rolls for an ordinary steel H-shape in the roughing universal roll mill as shown in FIG. 10, used in a rolling mill train for a steel H-section having projections on the outer surface of the flange as shown in FIG. 1. FIG. 12 to FIG. 15 show some examples of the vertical rolls according to the present invention in similar way as FIG. 10. Most of the vertical rolls 14a, 14b in the roughing universal roll mill, as shown in FIG. 11, are so designed that the upper and lower flanges of a material A are rolled to have an inclination of about 4–10° outwardly from the perpendicular, and are adapted in many rolling mills for the multiple production of various kinds and various sizes of materials. Accordingly the profile of the rolling surface is made by the upper and lower lines 15 and 16 and the arc 20 which is formed by the radius (R), so that a space is made between the rolling surface and the intersection point 17 of the upper and lower lines 15 and 16 and the distance from the rolling surface to the intersection point 17 along the center line (n) of the web is referred to as (l).

Figure 12:
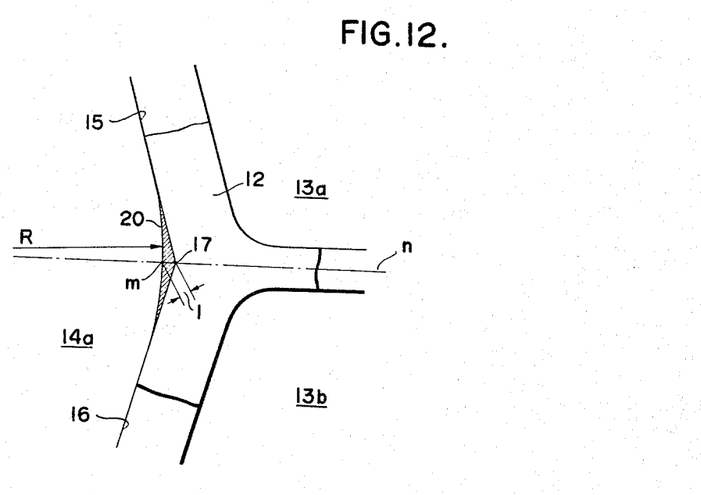
FIG. 12 to FIG. 15 are illustrative views showing embodiments of the present invention using the vertical roll shown in FIG. 10 in a roughing universal roll mill.
Figure 13:
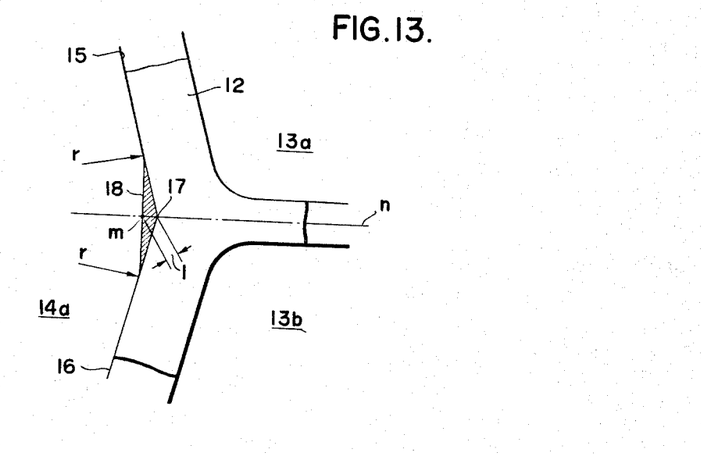
Figure 14:
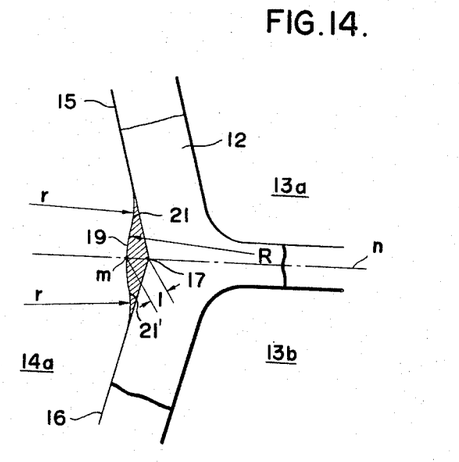

Now, examples of the form of the vertical roll of a roughing universal rolling mill used in the present invention for increasing the thickness of the outside surface of the joining part of the web and the flange of a material to be rolled are shown in FIGS. 12 to 15. FIG. 12 shows the profile of the rolling surface in a similar way as FIG. 11. The radius (R) is longer than that of FIG. 11, and the distance (l) is longer. In FIG. 13 the profile of the rolling surface is made by the upper and lower lines 15 and 16 and the perpendicular line 18 intersecting the point (m) on the center line (n) of the web. The distance (l) is longer than that of FIG. 11 and the radius (r) may be of any suitable length. In FIG. 14, the profile of the rolling surface is made by the upper and lower lines 15 and 16, an arc 19 drawn by the radius (R) having its center on the center line of the web, intersecting the point (m), and arcs 21 and 21' drawn by the radius (r) of appropriate length. The distance (l) is longer than that of FIG. 11.

Figure 15:
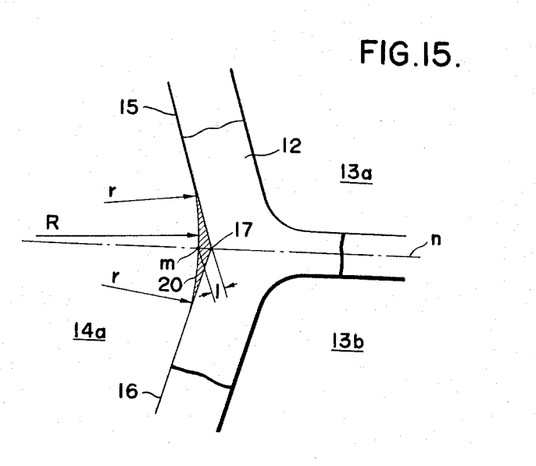

In FIG. 15, the profile of the rolling surface is made by an arc 20 of the radius (R) of enough length intersecting the point (m) and having its center on the center line (n) of the web, and the lines 15 and 16. (r) is a radius of appropriate length, and the distance (l) is longer than that of FIG. 11.

The thickness of the outside surface of the joining part of the web and the flange of a material to be supplied to the projection-forming finishing universal roll mill is increased by the roughing universal roll mill provided with such vertical rolls, and as for the increase in the thickness, it is, as mentioned above, enough to make the reduction uniform over the entire flange or to make the reduction in the joining part of the web and the flange a little larger than that in other parts. One example will be shown with experimental results. When many projections are formed over the entire outer surface of both flanges of a steel H-section of 192×197 W/F=⅝, and when any of the vertical rolls as shown in FIG. 12 to FIG. 15 is used in the roughing universal roll mill, a very good result is obtained by increasing the distance (l) to about 1.5 times the distance (l) of FIG. 11.

The above is the explanation of the case of the vertical roll in the roughing universal rolling mill as shown in FIG. 10. However, in some cases, vertical rolls having such a form as to make the flange almost perpendicular to the web, such as the vertical rolls in the finishing universal rolling mill shown in FIG. 2(a), are used in the roughing universal rolling mill. In this case also, this invention can be carried out by increasing the thickness of the outside surface of the joining part of the web and the flange of a material.

As for the rolling conditions applicable in the present invention, such as the material temperature, the reduction and the rolling speed at rolling for projection-forming, the rolling conditions for the ordinary steel H-section can be applied.

Next, the apparatus of the invention for manufacturing the H-section steel having projections in the surface as above explained will be described in detail below.

The apparatus according to the invention relates to the universal rolling mill for effectively and easily manufacturing the H-section steel having desirable projections on the outsides of the flange and/or the surfaces of the web and which has excellent characteristics as mentioned above.

The feature of the apparatus resides in that it is a universal rolling mill provided with rolls having notches in rolling surface.

The methods of manufacturing a steel H-section in hot-rolling are generally classified as under.

(A) Method by means of a universal rolling mill.

(B) Method of manufacturing a steel H-section only through the grooves of rolls which are provided in a double or triple roll type shape-rolling mill.

(C) Combined method of (A) and (B).

(D) Method of manufacturing mainly through grooves of rolls which are provided in a double or triple roll type shape-rolling mill and additionally by sub-vertical rolls, which are provided between the grooves with suitable means for strengthening the rolling of flanges of H-section steel. But it is impossible to form the projections by the method of (B), and in the method of (C) the vertical roll is so weak and small that sufficient pressure cannot be given, and therefore it is quite difficult to form projections of sufficient height on the outer surface of flanges.

Whereas, the apparatus of the present invention uses such a universal rolling mill as permits the use of a powerful vertical roll for the production of a steel H-section having desirable projections on the surfaces thereof, namely on the outer surface of the flange and/or on the web surface, as described above, wherein notches are provided on the rolling surfaces of a pair of horizontal rolls or a pair of vertical rolls so that enough pressure can be applied on the outer surface of the flange and thus projections of enough height can be formed on the outer surface of the flange as well as on the web surface. This is the important feature in using the universal rolling mill in the apparatus of the present invention. As for the formation of the notches on the rolling surface, kinds of notches and their combinations, number of notches, pitch of notches, position of notches, and their direction etc. are selected adequately corresponding to the individual applications of the H-section steel having projections on the surface to be manufactured, as mentioned before.

Thus the rolls having notches on the rolling surface are provided in a universal rolling mill as one pair of the upper and lower horizontal rolls and/or one pair of vertical rolls depending on the individual application of the steel H-section having projections on the surface to to be manufactured so that the required projections are suitably formed on the surface of the flange and/or on the web surface.

The universal rolling mill for manufacturing the steel H-section having projections on said surface according to the invention is used always after rough rolling as in a roughing roll mill or finishing roll mill on the rolling line in the process of steel H-section manufacturing, but generally, according to this invention it is desirable to use in combination the roughing roll mill with flat rolls and the surface projected steel H-section manufacturing universal roll mill.

Further, the universal rolling mill of this invention may be used after the ordinary finish rolling.

As for the number of rolling passes for forming projections on the surface of a steel H-section by the universal roll mill of the present invention, only one pass is sufficient in most cases, but more than one pass may be applied according to the kinds and forms of notches.

It is possible to use a finishing roll mill or a flange-edging mill for finishing the configuration of projections on the surface of a steel H-section or the form of the steel H-section itself, which has been rolled by the universal roll mill of the invention.

Examples of the process of the present invention are set forth as follows.

*Example 1*

Figure 7A:
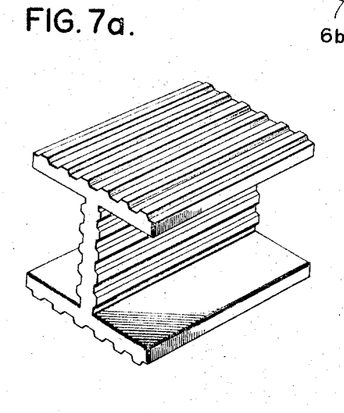
FIG. 7(a), (b), (c), (d) and (e) are illustrative views of respective examples of steel H-sections rolled according to the present invention, having projections on the outer surface of flanges and/or on the surface of the web.

A steel H-section having many spaced longitudinal projections of little rounded trapezoid cross section of 3 m./m. height and 5 m./m. width with 20 m./m. pitches on the outer surfaces of the both flanges and the both surfaces of the web, shown in FIG. 7(a) was obtained by applying one rolling pass on the steel H-section through a finishing mill (finishing universal mill) having vertical notches on the vertical roll and the horizontal roll in the finishing step in the rolling line.

*Example 2*

Figure 7B:
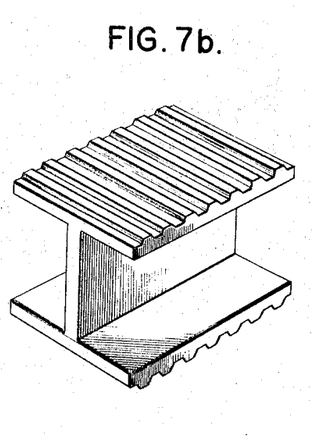

A steel H-section having many spaced traverse projections of little rounded trapezoid cross section of 2.5 m./m. height, and 4 mm. width with 15 mm. pitches on the outer surface of the both flanges, as shown in FIG. 7(b), was obtained by applying one rolling pass on the steel H-section through a finishing mill (finishing universal mill) having notches of inversed trapezoid cross section on the vertical roll, after the roughing rolling in the rolling line.

*Example 3*

Figure 7C:
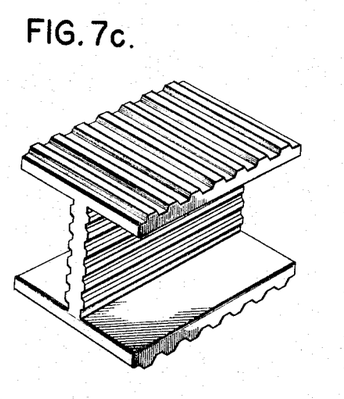
Figure 7D:
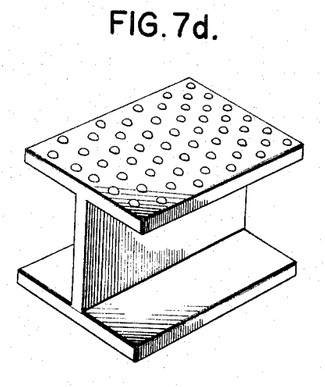
Figure 7E:
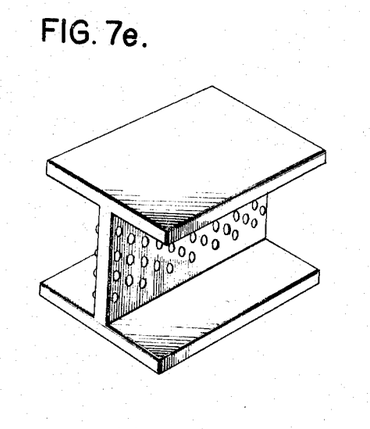

A steel H-section having many hemispherically projections of 10 mm. diameter on the outside surface of the flange at one side as shown in FIG. 7(d) was obtained by applying one rolling pass on the steel H-section through a finishing mill (finishing universal mill) having hemispherical notches on the vertical roll, after roughing rolling in the rolling line.

*Example 4*

A steel H-section having many spaced projections of little rounded trapezoid cross section of 2 mm. height and 10 mm. width with 10 mm. pitches on the surfaces of the web and many spaced projections of little rounded trapezoid cross section of 4 mm. height and 12 mm. width with 12 mm. pitches on the outer surfaces of the both flanges, as shown in FIG. 7(c) was obtained by applying one rolling pass on the H-section steel through a finishing mill (finishing universal mill) having longitudinal grooved notches of inverted trapezoid cross section on the horizontal rolls and lateral grooved notches of inverted trapezoid cross section on the vertical rolls, after roughing rolling in the rolling line.

*Example 5*

In forming hemispherical projections over the entire outer surface of both flanges of a steel H-section (semi-killed steel) of $192 \times 197$ $W/F = 5/8$, a material to be rolled was cooled naturally so as to minimize the temperature difference of the flanges and the temperature of the material was maintained about 720° C. in a process of rough rolling in a rolling line. The material was similarly treated before finish rolling in the rolling line. The material was passed one time with a reduction of 0.4 m./m. by the horizontal rolls and a reduction of 1.5% by the vertical rolls at a rolling speed of 1.3 m./sec. through a finish universal roll mill having hemispherical notches of 4 mm. depth over the entire rolling surfaces of one pair of vertical rolls, and hemispherical projections of about 1.2 mm. height were formed over the entire outer surfaces of both flanges. The height of the projections was uniform in this case.

*Example 6*

In forming cross type projections over the entire outer surface of the both flanges of a steel H-section (semi-killed steel) of $300 \times 305$ $W/F = 1/15$ (W is web thickness, F is flange-thickness) similarly as in Example 5, water was jetted onto the outer sides of the flanges to forcibly cool the both joining parts of the web and the flanges of the material after roughing rolling in the rolling line, so that the temperature difference in the flanges was decreased and the temperature of the material was maintained about 750° C. Similarly as in Example 1, the material was given one rolling pass with a reduction of 0.4 mm. by the horizontal rolls and a reduction of 3.8 mm. by the vertical rolls at a rolling speed of 3.2 m./sec. through a finishing universal rolling mill having cross type notches of 4 mm. depth over the entire rolling surfaces of one pair of vertical rolls, whereby cross type projections of about 2.3 mm. height were formed over the entire outer surfaces of the both flanges of the steel H-section. The height of the projections was uniform.

*Example 7*

In forming many longitudinal projections of trapezoid cross section over the entire outer surface of a flange at one side of a steel H-section of $300 \times 300$ $W/F = 10/15$ after rough rolling in the rolling line, water was jetted all over the web to forcibly cool the material so that the temperature of the material was maintained about 700° C. Then the material was given one rolling pass with a reduction of 0.8 mm. by the horizontal rolls and a reduction of 3.8 mm. by the vertical rolls at a rolling speed of 3 m./sec. through a finishing universal rolling mill having notches of inverted trapezoid cross section of 5 mm. depth circumferentially over the entire rolling surface of one of the vertical rolls, and longitudinal projections of little rounded trapezoid cross section of about 2.4 mm. height were formed over the entire outer surface of one of the flanges of the steel H-section. The height of the projections was uniform.

Example 8

In forming transversal projections of half circle cross section on the outer surface of the both flanges and on the both web surfaces of a steel H-section of $$200 \times 200 \ W/F = 9/12$$

after rough rolling in a rolling line, the material was rolled with one pass at its temperature of about 900° C. by a finishing universal roll mill having notches of half circular cross section of 5 mm. depth transversely over the entire rolling surfaces of a pair of horizontal rolls and a pair of vertical rolls, with a reduction by the horizontal rolls of 2.8 m./m., and a reduction by the vertical rolls of 3.2 m./m. at a rolling speed of 1.3 m./sec. Thereby transversal projections of half circular cross section of about 2 mm. height were formed on the outer surfaces of the both flanges and the both web surfaces of the steel H-section.

Example 9

In the rolling mill train of the universal rolling system as shown in FIG. 1, the vertical rolls shown in FIG. 14 were used in place of the both vertical rolls 14a and 14b in the roughing universal mill 3 under the conditions set forth in Table 1, and a material was rolled thereby. Then transversal projections were formed over the entire surface of the both flanges of the steel H-section (semi-killed) of $182 \times 197 \ W/F = 5/8$ by a projection-forming universal roll mill having notches 8 over the entire rolling surfaces of the vertical rolls 7a, 7b in FIG. 2(a). Height and configuration of the projections was uniform over the entire outer surfaces of the both flanges.

TABLE 1

Figure 6:
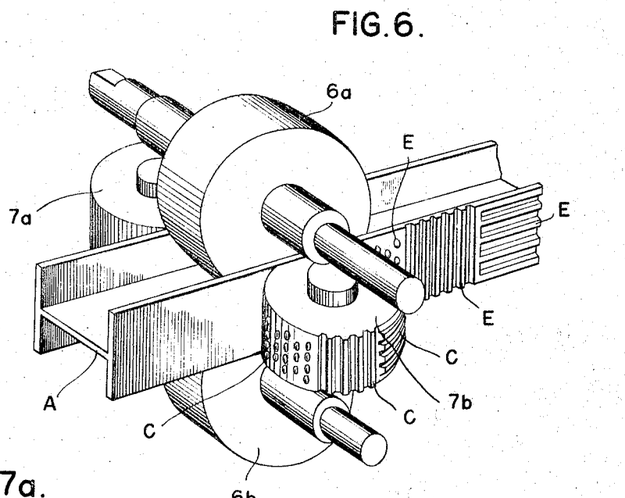
FIG. 6 is an illustrative view of another embodiment of the present invention using a universal roll mill with a pair of plain horizontal rolls, one flat vertical roll and one vertical roll having one or more kinds of notches on its rolling surface.

|  | Ordinary Vertical Roll shown in Fig. 6 | Vertical Roll of the present invention shown in Fig. 9 |
| --- | --- | --- |
| Upper and lower lines (15) (16). | Outwardly 6° to perpendicular line. | Same as left. |
| Radius (R) | 250 mm | Do. |
| Distance (l) | 1.4 mm | 2.0 mm. |
| Radius (r) |  | 250 mm. |

Example 10

Figure 3:
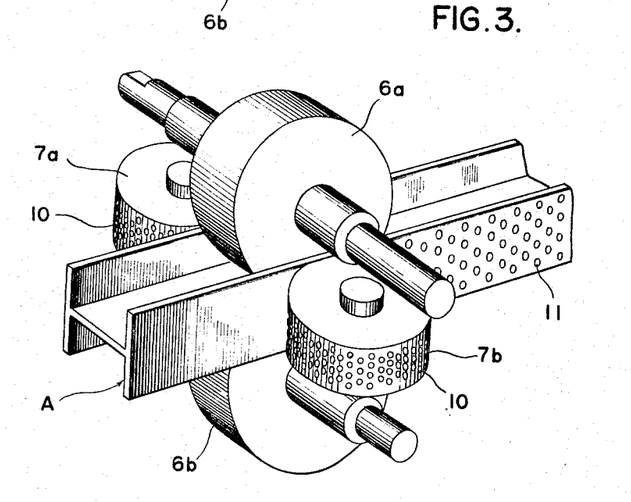
FIG. 3 is an illustrative view of another embodiment of the present invention using a universal roll mill with a pair of plain horizontal rolls, and a pair of vertical rolls having notches over the entire rolling surface.

Steel H-section (A) having hemisphere projections 11 over the entire outer surface of both flanges, with both web surfaces smooth, was manufactured by a universal roll mill as shown in FIG. 3 provided with a pair of plain horizontal rolls 6 and a pair of vertical rolls 7 having hemispherical notches 10 all over the rolling surface.

Example 11

Figure 4:
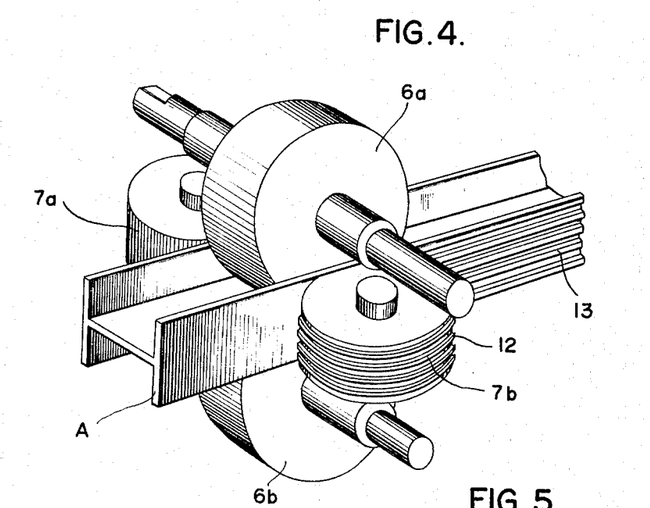
FIG. 4 is an illustrative view of another embodiment of the present invention using a universal roll mill with a pair of plain horizontal rolls, one plain vertical roll and one vertical roll having notches over the entire rolling surface.

A steel H-section (A) having projections 13 in the form of longitudinal ribs over the entire outer surface of one flange with smooth surfaces of the web and a smooth surface of the other flange was manufactured by a universal roll mill as shown in FIG. 4, provided with one vertical roll 7b having grooves 12 circumferentially around the entire rolling surface, and a pair of plain horizontal rolls 6 and one plain vertical roll 7.

Example 12

Figure 5:
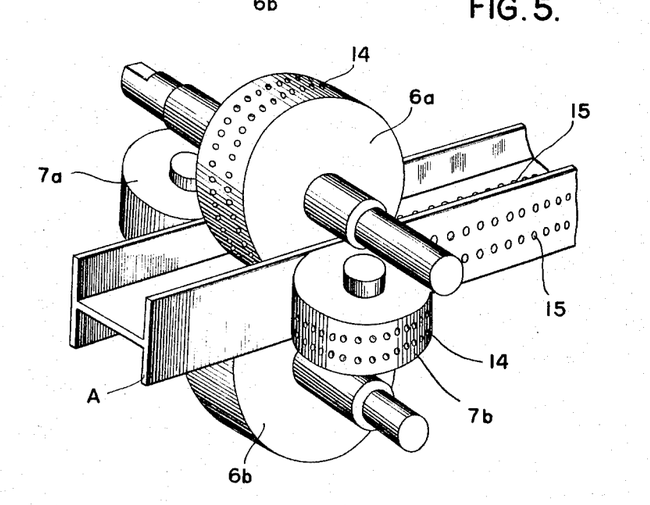
FIG. 5 is an illustrative view of a universal rolling mill with one horizontal roll and one vertical roll which are plain, and one horizontal roll and one vertical roll each having notches on the center portion of the rolling surface.

A steel H-section (A) having one smooth web surface and one smooth outer flange surface, with hemisphere projections 15 in the longitudinally central portion of the other outer flange surface and of the other surface of the web was manufactured by a universal roll mill, as shown in FIG. 5, provided with one plain horizontal roll 6b, one plain vertical roll 7a, and one horizontal roll 6a and one vertical roll 7b, the last two rolls having reversed hemispherical notches 14 arranged in circumferential rows extending centrally of the rolling surface.

Example 13

FIG. 6 shows one example of a universal rolling mill according to the present invention, wherein the pair of horizontal rolls 6a and 6b and one of the vertical rolls 7a are plain rolls, and the other of the vertical rolls 7b is a roll having more than one kind of notches (C) or patterns all over its rolling surface. Steel H-section (A) is rolled by the above rolling mill to obtain a steel H-section having one smooth outer flange surface and two smooth web surfaces, and having more than one kind of projections (E) over the entire other outer flange surface, and more than one kind of projections were formed by one rotation of the roll.

It is possible to exert sufficient pressure on both of the outer surface of the flanges and the web surfaces by this universal roll mill, and therefore it is also possible to manufacture steel H-section having projections of sufficient height on the outer surface of flanges and on the surface of the web. The steel H-section having projections on the surface, which is manufactured by this universal roll mill, has additional excellent characteristics which cannot be expected with an ordinary steel H-section. That is to say, the steel H-section manufactured by this universal roll mill, having projections on the outer surface of the flange and/or on the surface of the web, is much more excellent than the ordinary steel H-section as mentioned above, for example, for structural material. The projections look fine and its adherence to concrete material becomes very good.

Further when it is used as a piling material, for example, the adherence for sand and mud is also good, and when steel H-section having longitudinal projections on the outer surface of the flanges and/or on the surface of the web is so used, it is very advantageous because the pile can be driven perpendicularly.

Further as a constructive material for temporary use, for example, as a material to cover a road which is excavated for subway construction, the steel H-section having projections on the outer surface of the flange can be advantageously used. A steel H-section having projections on the outer surface of the flanges is very effective as compared with other road-covering materials, and the outer surface can be used as a road surface. Therefore, the steel H-section according to the present invention is very advantageous in many points.

What is claimed is:

1. A method of manufacturing a steel H-section including a pair of flanges interconnected by a web and having projections on the outer surface of at least one flange, the projections being uniform in height and configuration, said method comprising the steps of: rough rolling a steel ingot to produce an H-cross section beam including a pair of flanges interconnected by a web at junctures between the web and the flanges; during the rough rolling, subjecting the web to treatment to increase its resistance to deformation under pressure applied to the outer surfaces of the flanges; and finish rolling the rough-rolled H-beam using rolls pressing against the outer surfaces of the flanges and at least one having a rolling surface recessed to form said projections; the increased resistance to deformation of the web assuring those projections adjacent a juncture of the web with the flanges being uniform in height and configuration with the remainder of the projections formed on the same surface.

2. A method as claimed in claim 1, including the step of, during finish rolling the rough-rolled H-beam, using rolls pressing against the surfaces of the web, and at least one of which has a rolling surface recessed to form said projections on the engaged web surface.

3. A method of manufacturing a steel H-section including a pair of flanges interconnected by a web and having projections on the outer surface of at least one flange, the projections being uniform in height and configuration, said method comprising the steps of: rough rolling a steel ingot to produce an H-cross section beam including a pair of flanges interconnected by a web at junctures between the web and the flanges; during the rough rolling, increasing the wall thickness of the metal on the outer surfaces of the flanges at said junctures by using flange forming rough rolls contoured to provide such increase in wall thickness, to increase the resistance of the web to deformation under pressure applied to the outer surfaces of the flanges; and finish rolling the rough-rolled H-beam using rolls pressing against the outer surfaces of the flanges and at least one having a rolling surface recessed to form said projections; the increased resistance to deformation of the web assuring those projections adjacent a juncture of the web with the flanges being uniform in height and configuration with the remainder of the projections formed on the same surface.

4. A method, as claimed in claim 3, including the step of, during finish rolling of the rough-rolled H-beam, using rolls pressing against opposite surfaces of the web, and at least one of which has a rolling surface recessed to form said projections on the engaged surface of the web.

5. A method of manufacturing a steel H-section including a pair of flanges interconnected by a web and having projections on the outer surface of at least one flange, the projections being uniform in height and configuration, said method comprising the steps of: rolling a steel ingot to produce an H-cross section beam including a pair of flanges interconnected by a web at junctures between the web and the flanges, and using rolls pressing against the outer surfaces of the flanges and at least one having a rolling surface recessed to form said projections; and during the rolling selectively cooling the metal in a manner to increase the resistance of the web deformation under the pressure applied to the outer surfaces of the flanges; the increased resistance to deformation of the web assuring those projections a juncture of the web with the flanges being uniform in height and configuration with the remainder of the projections formed on the same surface.

6. A method, as claimed in claim 5, including the step of, during the rolling, using rolls pressing against the opposite surface of the web, at least one of which has a rolling surface recessed to form said projections on the engaged surface of the web.

7. A method of manufacturing a steel H-section including a pair of flanges interconnected by a web and having projections on the outer surface of at least one flange, the projections being uniform in height and configuration, said method comprising the steps of rolling a steel ingot to produce an H-cross section beam including a pair of flanges interconnected by a web at junctures between the web and the flanges, and using rolls pressing against the outer surfaces of the flanges and at least one having a rolling surface recessed to form said projections; during the rolling, subjecting the web and the flanges to selective reduction to increase the resistance of the web to deformation by an amount to insure a uniform resistance to deformation throughout the areas of the flanges; the increased resistance to deformation of the web assuring the projections adjacent a juncture of the web with the flanges being uniform in height and configuration with the remainder of the projections formed on the same surface.

8. A method, as claimed in claim 7, including the step of, during the rolling, using rolls pressing against opposite surfaces of the web, and at least one of which has a rolling surface recessed to form said projections on the engaged surface of the web.

References Cited
UNITED STATES PATENTS

| | | | |
|---|---|---|---|
| 1,812,246 | 6/1931 | Oberg | 72—366 |
| 1,812,248 | 6/1931 | Oberg | 72—366 |
| 1,856,898 | 5/1932 | Wood | 72—197 |
| 1,882,956 | 10/1932 | Sandler | 308—240 |
| 2,047,001 | 7/1936 | Cammen | 72—381 |
| 2,277,725 | 3/1942 | Smith | 29—18 |
| 2,782,487 | 2/1957 | Properzi | 29—1.22 |
| 3,165,948 | 1/1965 | Kishikawa | 72—366 |
| 3,251,213 | 5/1966 | Noda | 72—229 |

CHARLES W. LANHAM, *Primary Examiner.*

H. D. HOINKES, *Assistant Examiner.*